US008760816B1

(12) United States Patent
Myers et al.

(10) Patent No.: US 8,760,816 B1
(45) Date of Patent: Jun. 24, 2014

(54) DISK DRIVE WITH A BIASED ACTUATOR LATCH, AND HAVING A FIRST PERMANENT MAGNET THAT IS LARGER THAN A SECOND PERMANENT MAGNET

(71) Applicant: Western Digital Technologies, Inc., Irvine, CA (US)

(72) Inventors: David K. Myers, Campbell, CA (US); Daniel T. Nguyen, Milpitas, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/860,505

(22) Filed: Apr. 10, 2013

(51) Int. Cl.
*G11B 5/39* (2006.01)

(52) U.S. Cl.
USPC ..................................................... 360/256.2

(58) Field of Classification Search
USPC ........................................................ 360/256.2
See application file for complete search history.

(56) References Cited

U.S. PATENT DOCUMENTS

| 5,459,362 | A | 10/1995 | Dunfield et al. |
| 6,574,073 | B1 | 6/2003 | Hauert et al. |
| 7,248,440 | B2 * | 7/2007 | Kim et al. .................. 360/256.2 |
| 7,369,367 | B2 | 5/2008 | Chang et al. |
| 7,660,075 | B1 | 2/2010 | Lin et al. |
| 7,684,155 | B1 | 3/2010 | Huang et al. |
| 7,715,149 | B1 * | 5/2010 | Liebman et al. ........... 360/256.2 |
| 7,957,102 | B1 * | 6/2011 | Watson et al. ................ 360/256 |
| 8,031,438 | B2 * | 10/2011 | Kim et al. .................. 360/256.2 |
| 8,081,401 | B1 * | 12/2011 | Huang et al. ............... 360/256.2 |
| 8,159,787 | B2 * | 4/2012 | Choi et al. .................. 360/256.2 |
| 8,305,713 | B2 | 11/2012 | Ishii et al. |
| 8,416,533 | B2 * | 4/2013 | Lee et al. .................... 360/256.2 |
| 8,477,460 | B1 * | 7/2013 | Liebman .................... 360/256.2 |
| 2002/0075604 | A1 | 6/2002 | Hong et al. |
| 2003/0081354 | A1 | 5/2003 | Ooi et al. |
| 2010/0007994 | A1 | 1/2010 | Hosokawa |
| 2012/0161550 | A1 | 6/2012 | Yoshida et al. |

\* cited by examiner

*Primary Examiner* — Mark Blouin

(57) ABSTRACT

A disk drive includes a disk drive base and a disk rotatably mounted to the disk drive base. First and second permanent magnets are fixed to the disk drive base. An actuator is pivotably mounted to the disk drive base. The actuator defining an actuator pivot axis about which the actuator pivots. The actuator includes an actuator coil disposed between the first and second permanent magnets. An actuator latch is disposed adjacent to the actuator. The actuator latch includes a biasing element that comprises a ferromagnetic material. An overlapping portion of the first permanent magnet overlaps the second permanent magnet as viewed from a viewing direction that is parallel to the actuator pivot axis. A protruding portion of the first permanent magnet does not overlap the second permanent magnet as viewed from the viewing direction.

11 Claims, 5 Drawing Sheets

ND A FIRST PERMANENT
DISK DRIVE WITH A BIASED ACTUATOR LATCH, AND HAVING A FIRST PERMANENT MAGNET THAT IS LARGER THAN A SECOND PERMANENT MAGNET

BACKGROUND

The typical hard disk drive includes a head disk assembly (HDA) and a printed circuit board assembly (PCBA) attached to a disk drive base of the HDA. The HDA includes at least one disk (such as a magnetic disk, magneto-optical disk, or optical disk), a spindle motor for rotating the disk, and a head stack assembly (HSA). The HSA includes at least one head, typically several, for reading and writing data from and to the disk. In an optical disk drive, the head will typically include a mirror and objective lens for reflecting and focusing a laser beam on to a surface of the disk. The HSA is controllably positioned in response to servo control signals from a disk controller on the PCBA. In so doing, the attached heads are moved relative to concentric circular tracks of information recorded on the disk. The spindle motor typically includes a rotatable spindle motor hub on which the disks are mounted and a stator. Rotation of the spindle motor hub results in rotation of the attached disks.

The HSA includes an actuator, at least one head gimbal assembly (HGA), and a flex cable. A conventional "rotary" or "swing-type" actuator typically includes an actuator body. The actuator body has a pivot bearing cartridge to facilitate rotational movement of the actuator. One or more actuator arms extend from the actuator body. Each actuator arm typically supports at least one HGA that includes a head. An actuator coil is supported by the actuator body opposite the actuator arms. The actuator coil is typically configured to interact with one or more magnets, typically a pair of identical magnets, to form a voice coil motor. The PCBA controls current passing through the actuator coil that results in a torque being applied to the actuator.

A latching mechanism is provided to facilitate latching of the actuator in a parked position when the heads are not being used to read from or write to the tracks of information on the disk. In the parked position, the actuator is positioned with the heads either at an inner diameter (ID) of the disk or at or beyond an outer diameter (OD) of the disk such as upon a ramp. A crash stop coupled to the disk drive base is provided to limit rotation of the actuator in a given direction. The crash stop is configured to contact a portion of the actuator when the actuator is rotated to an extreme rotational position in a given rotational direction. Another crash stop may be provided to limit actuator rotation in an opposite rotational direction. The latching mechanism may additionally function as one of the crash stops.

Disk drives have found ever increasing utility in small mobile electronic devices such as laptop and hand-held computing devices, audio devices, audio/video devices, and personal electronic organizers. In such applications there is an enhanced risk that the disk drive may be subject to mechanical shock events, for example when the host device is dropped. During a mechanical shock event, the disk drive base may experience significant rotational accelerations that can cause a sudden relative rotation of the actuator. Such a sudden relative rotation of the actuator may result in damage to the HSA, especially to its attached head gimbal assemblies. The adjacent disk surface(s) may also be damaged, which may result in loss of data. Various latch designs have attempted to secure the actuator during such mechanical shock events.

Such actuator latches may be biased (e.g. to an open position during disk drive operation) by a magnetic force during disk drive operation. For example, an actuator latch may include a ferromagnetic material (e.g. a steel ball) that is attracted to one or both voice coil motor (VCM) magnets. However, expected possible mechanical shocks during disk drive operation, especially in disk drives used in mobile electronic devices such as laptops, may require that the magnetic biasing force on the latch be increased relative to today's state of the art. Accordingly, there is need in the art for improved structures to magnetically bias an actuator latch in a disk drive.

DETAILED DESCRIPTION OF EXAMPLE EMBODIMENTS

Figure 1:
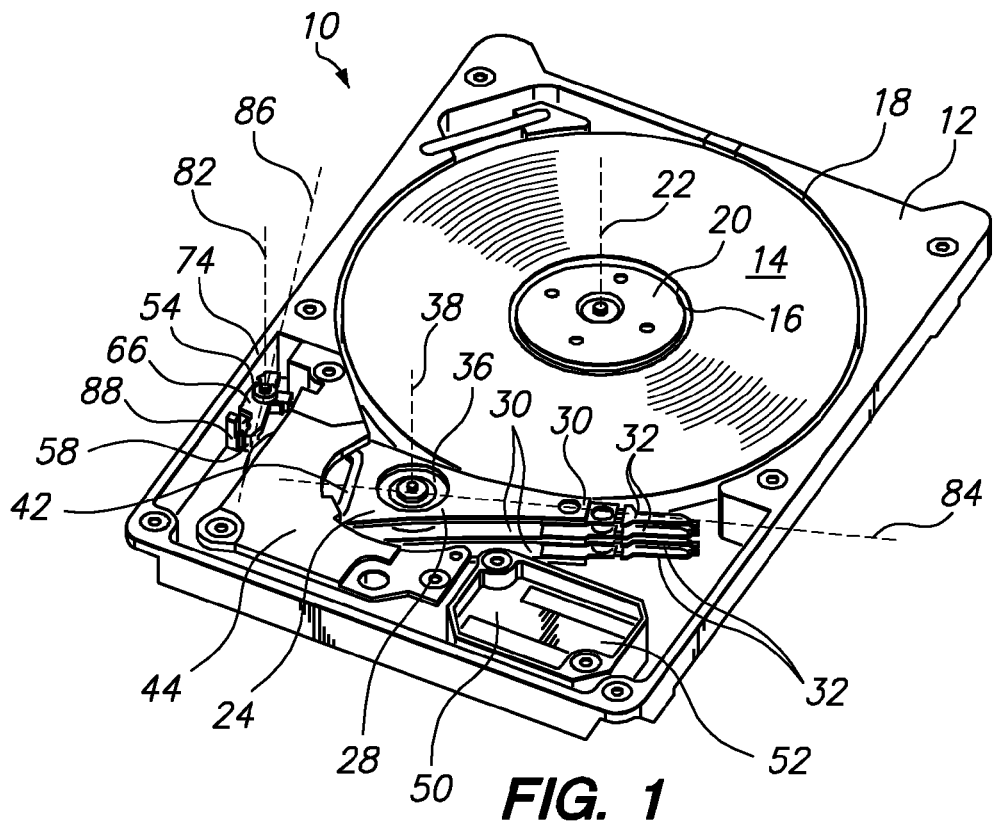
FIG. 1 is a top perspective view of a disk drive capable of including an embodiment of the present invention.
Figure 2:
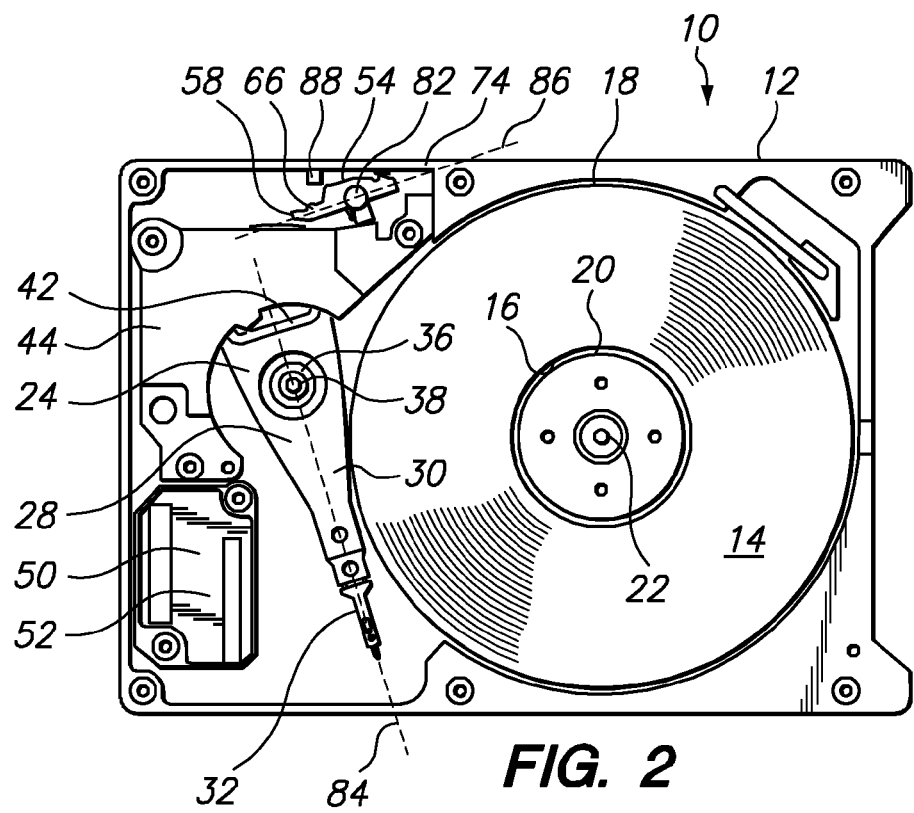
FIG. 2 is a top plan view of the disk drive of FIG. 1.

FIGS. 1 and 2 depict a top perspective view and a top plan view of a disk drive 10 that is capable of including an embodiment of the present invention, respectively. The disk drive 10 includes a head disk assembly (HDA) and a printed circuit board assembly (PCBA) (not shown). The head disk assembly includes a disk drive base 12 and a cover (not shown for ease of illustration of the internal disk drive components). The disk drive base 12 and the cover collectively comprise a housing that encloses disk(s) 14 and several other components.

In the example of FIGS. 1 and 2, a single disk 14 or multiple disks 14 may be utilized. Each disk 14 defines an inner diameter (ID) 16 and an outer diameter (OD) 18. The disk 14 includes opposing disk media surfaces which may include one or more magnetic layers. Data may be recorded along data tracks on a single disk media surface or on both. The HDA further includes a spindle motor 20 for rotating the disks 14 about a disk rotation axis 22. The HDA further includes a head stack assembly 24 rotatably attached to the disk drive base 12.

In the example of FIGS. 1 and 2, the head stack assembly 24 includes an actuator body 28 and actuator arms 30 that extend from the actuator body 28. For angular reference purposes, each actuator arm 30 may define an actuator arm longitudinal axis 84. Distally attached to the actuator arms 30 are suspension assemblies 32. It is contemplated that the number of actuator arms 30 and suspension assemblies 32 may vary depending upon the number of disks 14 and disk surfaces utilized.

In the example of FIGS. 1 and 2, each of the suspension assemblies 32 supports a conventional head (too small to be visible in FIGS. 1 and 2). The suspension assemblies 32 with the heads are referred to as head gimbal assemblies (HGAs). Each head includes a transducer for at least reading data from a disk surface. The transducer may include both a read element and a writer. In magnetic recording applications, the transducer's writer may be of a longitudinal or perpendicular design, and the read element of the transducer may be inductive or magnetoresistive. In optical and magneto-optical recording applications, the head may also include an objective lens and an active or passive mechanism for controlling the separation of the objective lens from a media surface of the disk 14.

In the example of FIGS. 1 and 2, the HSA 24 may be pivoted such that each suspension assembly 32 is disposed with its head adjacent to various data tracks (e.g from adjacent to the outer diameter 18 to adjacent to the inner diameter 16 of the disk 14). In the embodiment shown, the actuator body 28 includes a bore, with a pivot bearing cartridge 36 engaged within the bore for facilitating the actuator body 28 to rotate between limited positions about an actuator pivot axis 38.

Figure 3:
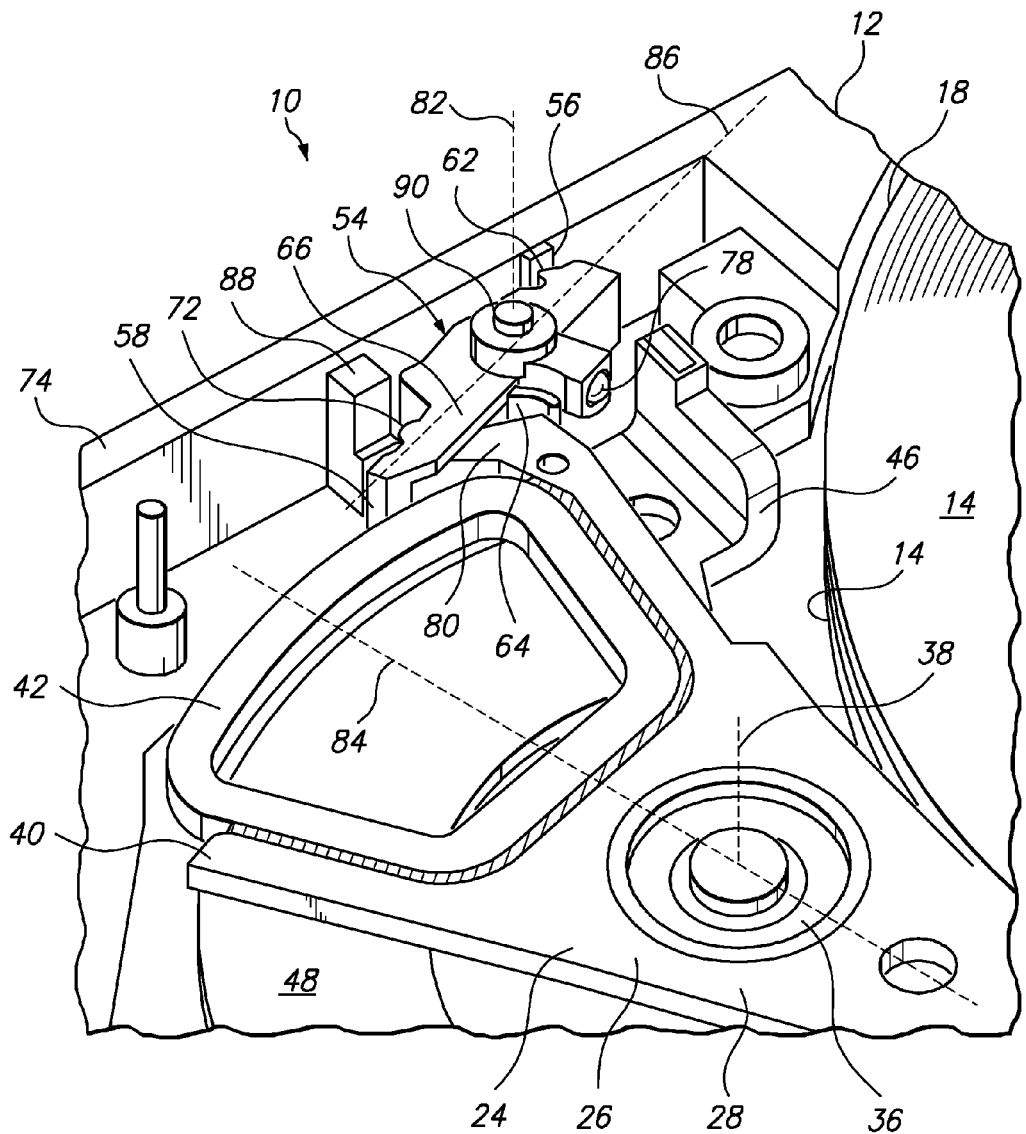
FIG. 3 depicts a disk drive capable of including an embodiment of the present invention, with the top VCM permanent magnet and magnet support plate removed, and with the actuator latch in a closed position.

FIG. 3 is a perspective view of the disk drive 10, with an actuator latch 54 in a closed position. Now referring to FIGS. 1-3, the HSA 24 further includes a coil support element 40 that extends from one end of the actuator body 28 opposite the actuator arm(s) 30. The coil support element 40 is configured to support a coil 42. The disk drive 10 includes a top VCM yoke plate 44 having an under-surface that supports a top VCM permanent magnet (obscured by the top VCM yoke plate 44 in FIGS. 1 and 2. The yoke is preferably fabricated from a high-permeability ferromagnetic material, to provide a magnetic flux return path. In FIG. 3, the top VCM permanent magnet and yoke plate have been removed, to expose underlying components for illustration herein.

In example of FIG. 3, the disk drive 10 includes a bottom VCM yoke plate 46, and a bottom VCM permanent magnet 48 that is attached to and supported by a top surface of the bottom VCM yoke plate 46. Now referring to FIGS. 1-3, the actuator coil 42 is positioned between the bottom permanent VCM magnet 48 and the top VCM permanent magnet (which is attached to an under-surface of the top VCM yoke plate 44) to form a voice coil motor (VCM) for controllably pivoting the actuator 26 of the HSA 24. With this configuration, driving an electrical current through the coil 42 results in a torque being applied to the actuator 26. A change in direction of the driven electrical current through the coil 42, results in a change in direction of the torque applied to the actuator 26.

In certain embodiments, the head stack assembly 24 further includes a flex cable assembly 50 (details of which are not shown for ease of illustration of other components, and a cable connector 52. For example, a flex cable and pre-amplifier circuitry is not shown in FIGS. 1 and 2. The cable connector 52 may be attached to the disk drive base 12 and may be disposed in electrical communication with the PCBA. The flex cable assembly 50 supplies current to the coil 42 and carries signals between the heads and the PCBA.

In the example of FIG. 3, the disk drive 10 includes fixed members 56 and 88 in fixed spatial relation to the disk drive base 12. The actuator 26 is pivotably coupled to the disk drive base 12 and includes an actuator catch 80. The latch 54 includes a catch portion 58 positioned such that, when the latch 54 is in a closed position, the catch portion 58 will interfere with rotation of the actuator 26 via contact with the catch 80 should the actuator 26 rotate sufficiently (e.g. due to a mechanical shock event).

In the example of FIG. 3, the latch 54 further includes a latch arm 66, a first stop portion 62, and a pusher portion 64. The first stop portion 62 is in contact with the fixed member 56 with the latch 54 in the closed position. The pusher portion 64 is in contact with the actuator 26 with the latch 54 in the closed position and with the actuator 26 in an extreme rotational position. For angular reference purposes the latch arm 66 is shown to define a latch arm longitudinal axis 86.

In the example of FIG. 3, the disk drive 10 includes a latch post 90 extending from the disk drive base 12. The latch post 90 and the disk drive base 12 optionally may be a single component having material continuity as opposed to being an assembly of sub-components. The latch post 90 may define a latch axis or rotation 82 about which the latch 54 rotates. The latch 54 may optionally define a hole into which the latch post 90 may protrude.

As mentioned above, the disk drive 10 may include fixed members 56 and 88 in fixed spatial relation to the disk drive base 12. In this regard, the fixed members 56 and 88 optionally may be a disk drive base wall 74 of the disk drive base 12 itself. Alternatively, the fixed members 56 and 88 optionally may be separately formed pieces of material that are attached to the disk drive base 12. Fixed members 56 and 88 may also be integrally formed with each other. Preferably the fixed members 56 and 88 maintain their position relative to the disk drive base 12.

In the example of FIG. 3, the latch 54 includes a latch arm 66 supporting a catch portion 58. The latch 54 may further comprise a second stop portion 72 in contact with the fixed member 88 with the latch 54 in an open position. The second stop portion 72 is not in contact with the fixed member 88 with the latch 54 in the closed position. The catch portion 58 may be of various shapes and sizes and be configured to engage the actuator 26 at the catch 80 in alternate ways. For example, the catch portion 58 could be configured to receive the catch 80 in the form of a hook. Alternatively, the catch portion 58 could be formed as a hook and the catch 80 could be formed to receive such hook. It is contemplated that the catch 80 may be of other configurations such as a tang or pin.

In the example of FIG. 3, in the closed position the catch portion 58 is preferably positioned along a path of a portion of the actuator 26, such that contact between the catch portion 58 and the actuator catch 80 can occur so as to prevent rotational movement of the actuator 26 in a given direction. Then the catch portion 58 may interfere with rotation of the actuator 26 with the latch 54 in a closed position. In this regard, the catch portion 58 may be contacted by the actuator 26, for example to limit angular motion during a mechanical shock event. Thus, the catch portion 58 is not always in contact with the actuator 26 when the latch 54 is in a closed position. It is noted that in the example of FIG. 3, the catch portion 58 and the catch 80 of the actuator 26 are configured to potentially impact one another upon extreme rotation of the actuator 26.

Referring again to FIGS. 1-3, the actuator 26 and HSA 24 are depicted in a parked position—e.g. rotated fully in a clockwise direction with the heads positioned radially beyond the outer diameter 18 of each of the disks 14. In this position the suspension assemblies 32 may be received by a ramp (not shown). The parked position is the disposition that the actuator 26 is configured to come to rest when not performing read or write operations. The latch 54 is depicted in a closed position and is rotated fully in a counter-clockwise direction. The actuator 26 is disposed in contact with the pusher portion 64. In particular, the backside of the catch 80 is in contact of the pusher portion 64. Because the first stop portion 62 of the latch 54 is disposed in contact with the fixed member 56, this configuration prevents the actuator 26 from rotating any further in the clockwise direction.

Figure 4:
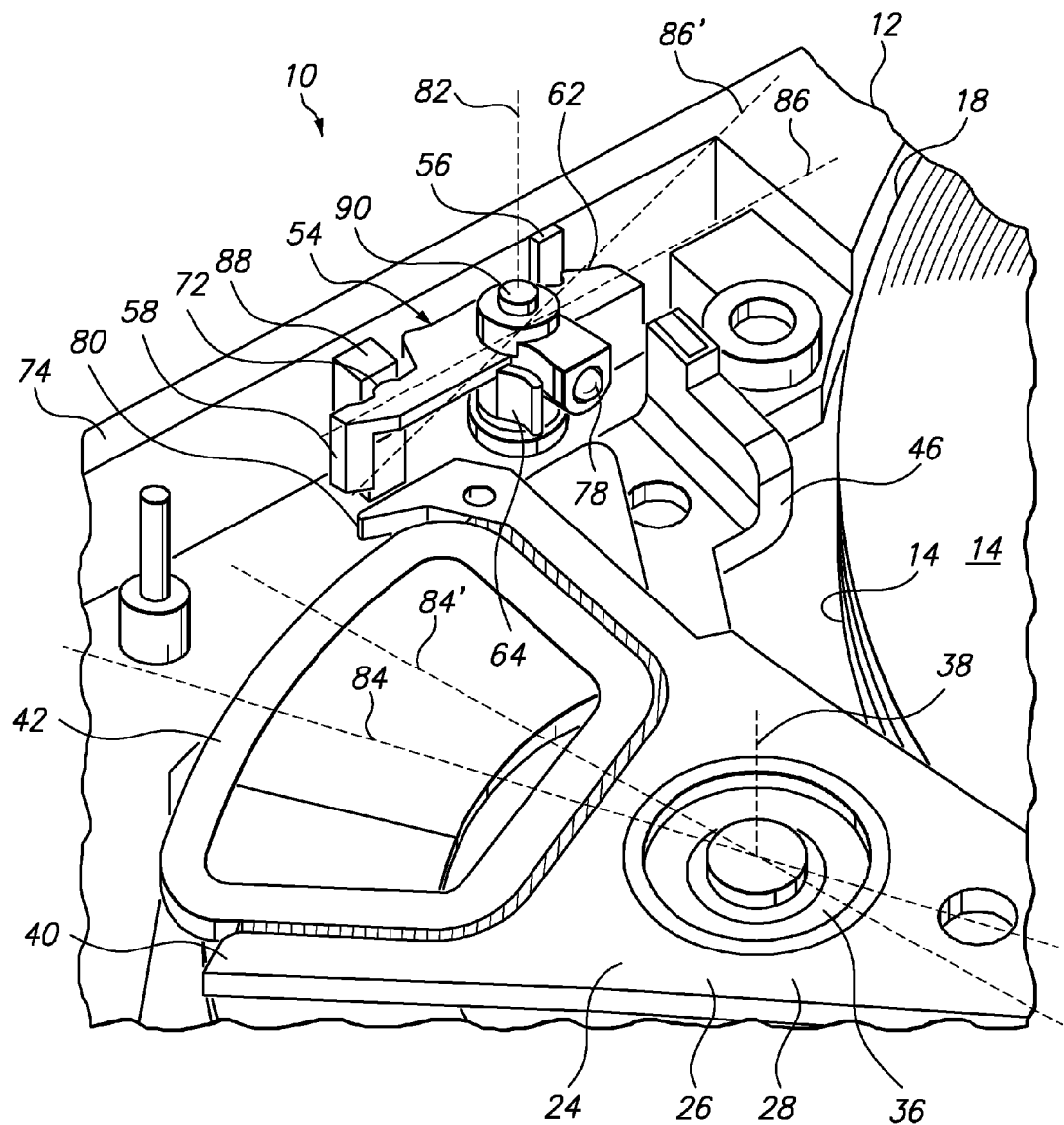
FIG. 4 depicts a disk drive capable of including an embodiment of the present invention, with the top VCM permanent magnet and magnet support plate removed, and with the actuator latch in an open position.

FIG. 4 depicts the disk drive 10, with the actuator latch 54 in an open position. The first stop portion 62 is not in contact with the fixed member 56 with the latch 54 in the open position. The catch portion 58 does not interfere with rotation of the actuator 26 with the latch 54 in the open position. Moreover, the latch 54 may be biased to the open position shown in FIG. 4. For example, the latch 54 may include a magnetic latch biasing element 78, that may comprise a ferromagnetic metal material such as a steel ball bearing (e.g. 400 series stainless steel). Alternatively, it is contemplated that the latch 54 could be configured in another embodiment to be biased in a closed position.

In the example of FIG. 4, the actuator 26 is shown to be in one of many operable positions, with the heads positioned on the disks 14 somewhere between the inner diameter 16 and the outer diameter 18 (shown in FIG. 2). That is, the actuator 26 is shown in FIG. 4 as having been rotated counter-clockwise from the parked position. An actuator arm longitudinal axis 84' is superimposed for reference purposes to indicate the positioning of the actuator arm longitudinal axis 84 as it had been with the actuator 26 in the parked position. It is assumed that the actuator 26 has been rotated by a controlled VCM induced movement during normal operation of the actuator 26 in performing read or write operations.

In the embodiment of FIG. 4, because the latch 54 is biased to the open position, as the actuator rotates away from the parked position, the latch 54 also begins to rotate from the closed position in a clockwise direction (e.g. from a rotational position corresponding to a latch longitudinal axis 86' to a rotational position corresponding to latch longitudinal axis 86 as shown). As such, by the time the actuator 26 is rotated to approach the position corresponding to longitudinal axis 84, the latch 54 has rotated to the open position, with the catch portion 58 at a location where the catch portion 58 is not capable of contacting the catch 80 of the actuator 26 (e.g. a rotational position corresponding to latch longitudinal axis 86 as shown).

Figure 5:
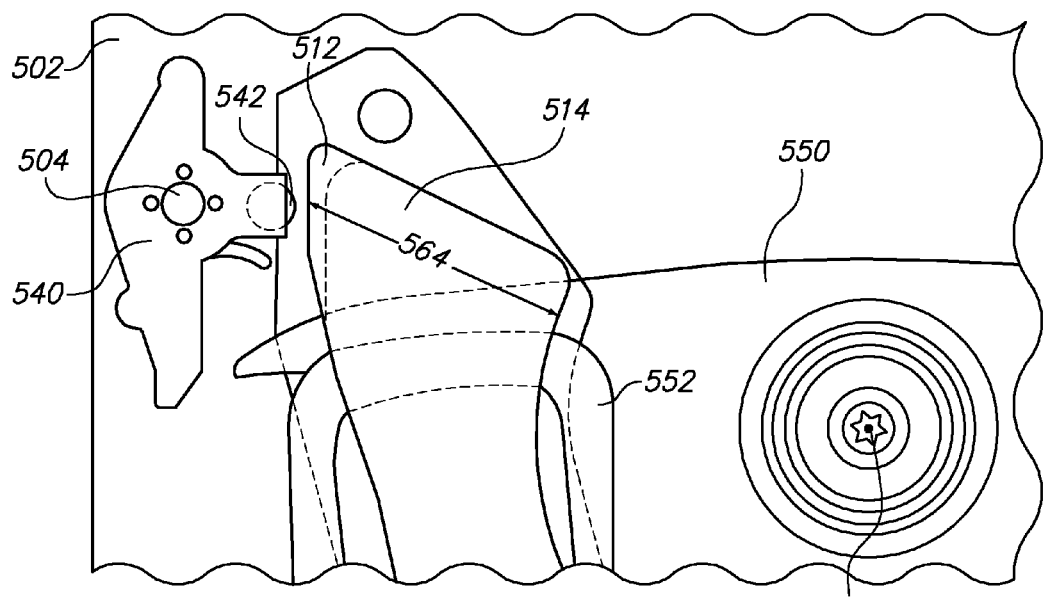
FIG. 5 is a plan view of a disk drive VCM magnet and actuator latch configuration according to an embodiment of the present invention.
Figure 6:
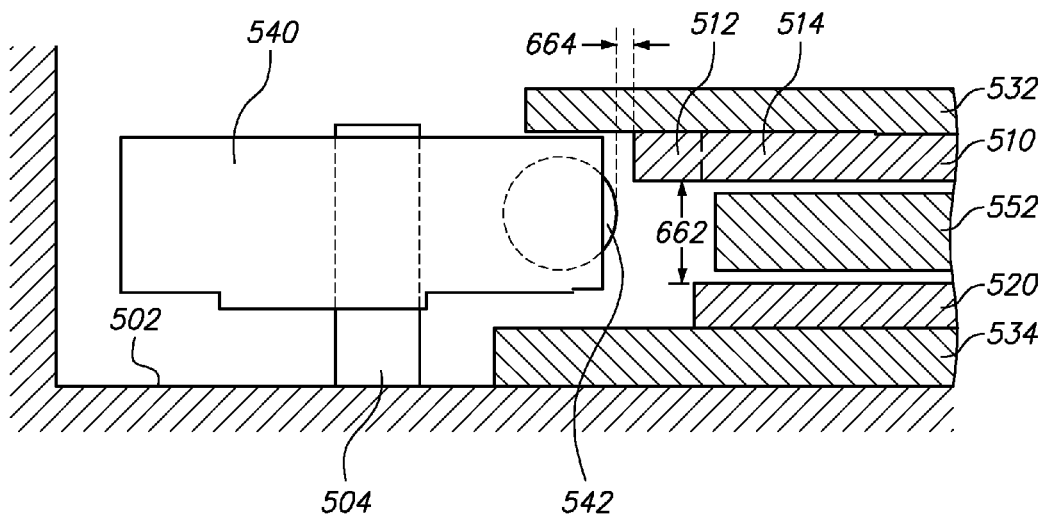
FIG. 6 is a side view of a disk drive VCM magnet and actuator latch configuration according to an embodiment of the present invention.

FIG. 5 is a plan view of a disk drive VCM magnet and actuator latch configuration according to an embodiment of the present invention. FIG. 6 is a side view of this configuration. In the embodiment of FIGS. 5-6, a larger first permanent magnet 510 is fixed to a disk drive base 502 via a supporting top yoke plate 532, and a smaller second permanent magnet 520 is fixed to the disk drive base 502 via a supporting bottom yoke plate 534. However, in an alternate embodiment, the larger first permanent magnet 510 might be fixed to the disk drive base 502 via the bottom yoke plate 534, and the smaller second permanent magnet 520 might be fixed to the disk drive base 502 via the top yoke plate 532. Note that in this context, "top" refers to being closer to a conventional disk drive cover, while "bottom" refers to being further from a conventional disk drive cover. The first and second permanent magnets 510, 520 are preferably but not necessarily so-called "rare earth" magnets, comprising an alloy containing samarium, neodymium, dysprosium, praseodymium, terbium, gadolinium, and/or yttrium.

In the embodiment of FIGS. 5-6, an actuator 550 is pivotably mounted to the disk drive base 502. The actuator 550 defines an actuator pivot axis 554 (normal to the page in FIG. 5) about which the actuator 550 pivots. The actuator 550 includes an actuator coil 552 disposed between the first and second permanent magnets 510, 520. An actuator latch 540 is disposed adjacent to the actuator 550, and can rotate about a latch post 504 that extends from the disk drive base 502.

In the embodiment of FIGS. 5-6, an overlapping portion 514 of the first permanent magnet 510 overlaps the second permanent magnet 520 as viewed from a viewing direction that is parallel to the actuator pivot axis 554 (normal to the page in FIG. 5). However, a protruding portion 512 of the first permanent magnet 510 does not overlap the second permanent magnet 520 as viewed from the viewing direction (normal to the page in FIG. 5). In the embodiment of FIGS. 5-6, the first permanent magnet 510 is preferably but not necessarily at least 300 microns larger than the second permanent magnet 520, as measured in a measurement direction 564 that is normal to the actuator pivot axis 554.

In the embodiment of FIGS. 5-6, the actuator latch 540 includes a biasing element 542 that comprises a ferromagnetic material. For example, the biasing element 542 may be a steel or stainless steel ball. As can be seen in FIGS. 5-6, the biasing element 542 is preferably but not necessarily disposed closer to the protruding portion 512 of the first permanent magnet 510 than it is to the second permanent magnet 520. In the embodiment of FIG. 6, the first and second permanent magnets are separated by a first separation distance 662, and the biasing element 542 of the actuator latch 540 is separated from the first permanent magnet 510 by a second separation distance 664 that is preferably but not necessarily less than the first separation distance 662.

In certain embodiments, the foregoing dimensional limitations and inequalities may enhance the magnetic biasing force on the actuator latch 540, and thereby improve disk drive robustness to survive mechanical shocks.

Figure 7:
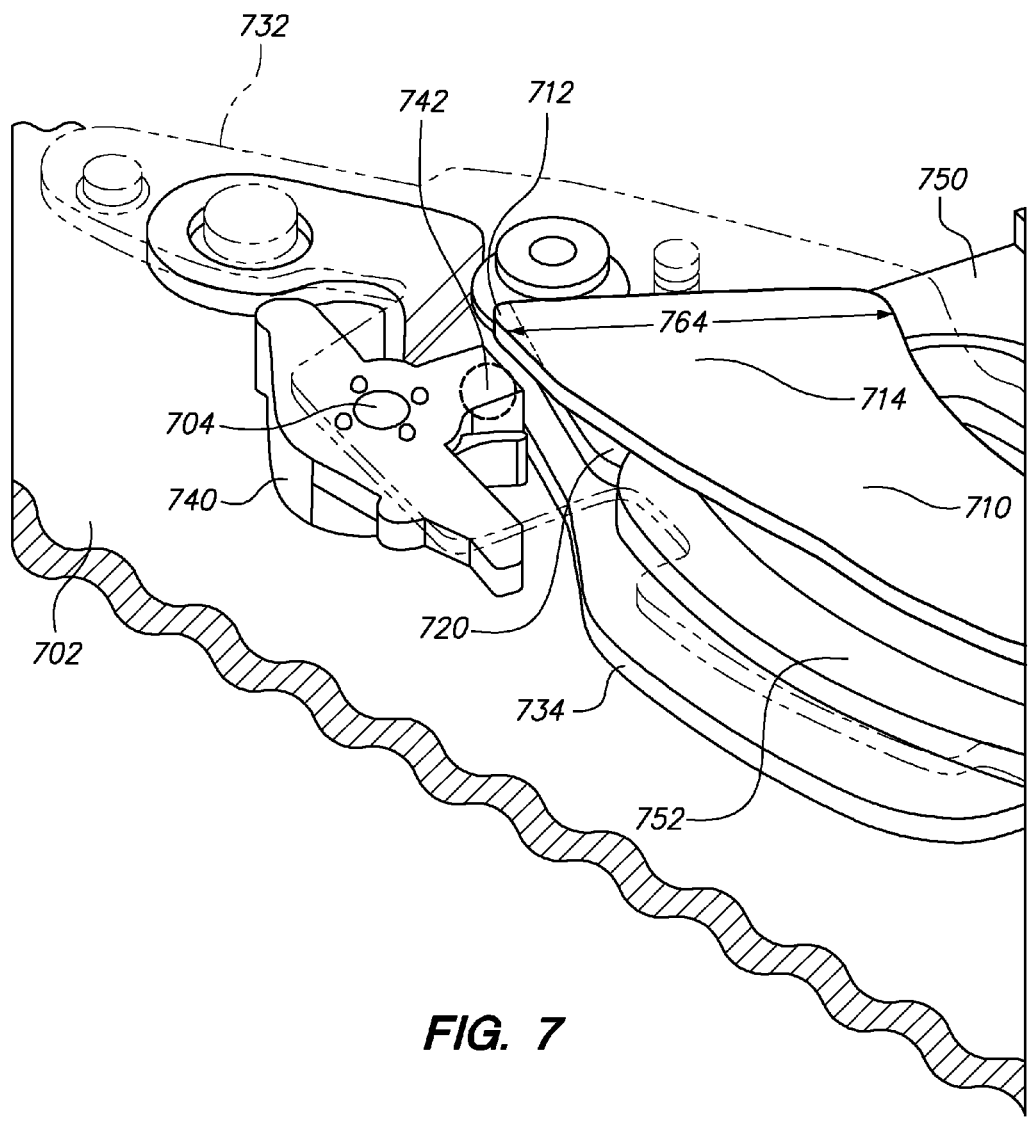
FIG. 7 is a perspective view of a disk drive VCM and actuator latch according to an embodiment of the present invention.

FIG. 7 is a perspective view of a disk drive VCM and actuator latch according to an embodiment of the present invention. In the embodiment of FIG. 7, a larger first permanent magnet 710 is fixed to a disk drive base 702 via a supporting top yoke plate 732 (shown in phantom lines). A smaller second permanent magnet 720 is fixed to the disk drive base 702 via a supporting bottom yoke plate 734. However, in an alternate embodiment, the larger first permanent magnet 710 might be fixed to the disk drive base 702 via the bottom yoke plate 734, and the smaller second permanent magnet 720 might be fixed to the disk drive base 702 via the top yoke plate 732 (shown in phantom lines). Note that again in this context, "top" refers to being closer to a conventional disk drive cover (towards the top of the page in FIG. 7), while "bottom" refers to being further from a conventional disk drive cover (towards the disk drive base 702 in FIG. 7). The first and second permanent magnets 710, 720 are preferably but not necessarily so-called "rare earth" magnets, comprising an alloy containing samarium, neodymium, dysprosium, praseodymium, terbium, gadolinium, and/or yttrium.

In the embodiment of FIG. 7, an actuator 750 is pivotably mounted to the disk drive base 702. The actuator 750 includes an actuator coil 752 disposed between the first and second permanent magnets 710, 720. Note that an actuator tang, which would extend from the actuator body where it supports the actuator coil 752, is not shown in FIG. 7 so that the view of the second permanent magnet 720 is not further obscured. An actuator latch 740 is disposed adjacent to the actuator 750, and can rotate about a latch post 704 that extends from the disk drive base 702.

In the embodiment of FIG. 7, an overlapping portion 714 of the first permanent magnet 710 overlaps the second permanent magnet 720 as viewed from a viewing direction that is parallel to the actuator pivot axis (e.g. actuator pivot axis 38 of FIGS. 3-4). However, in the embodiment of FIG. 7, a protruding portion 712 of the first permanent magnet 710 does not overlap the second permanent magnet 720 as viewed from that viewing direction. In the embodiment of FIG. 7, the first permanent magnet 710 is preferably but not necessarily at least 300 microns larger than the second permanent magnet 720, as measured in a measurement direction 764 that is normal to the actuator pivot axis (e.g. actuator pivot axis 38 of FIGS. 3-4).

In the embodiment of FIG. 7, the actuator latch 740 includes a biasing element 742 that comprises a ferromagnetic material. For example, the biasing element 742 may be a steel or stainless steel ball. As can be seen in FIG. 7, the biasing element 742 is preferably but not necessarily disposed closer to the protruding portion 712 of the first permanent magnet 710 than it is to the second permanent magnet 720. In certain embodiments, the foregoing dimensional limitations and inequalities may help enhance the magnetic biasing force on the actuator latch 740, and thereby help improve disk drive robustness to survive mechanical shocks.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

What is claimed is:

1. A disk drive comprising:
   a disk drive base;
   a disk rotably mounted to the disk drive base;
   a ferromagnetic metal yoke structure that is attached to the disk drive base and that includes top and bottom magnet support plates;
   first and second permanent magnets fixed to the ferromagnetic metal yoke structure;
   an actuator pivotably mounted to the disk drive base, the actuator defining an actuator pivot axis about which the actuator pivots, the actuator including an actuator coil disposed between the first and second permanent magnets; and
   an actuator latch disposed adjacent to the actuator, the actuator latch including a biasing element that comprises a ferromagnetic material;
   wherein an overlapping portion of the first permanent magnet overlaps the second permanent magnet as viewed from a viewing direction that is parallel to the actuator pivot axis, and a protruding portion of the first permanent magnet does not overlap the second permanent magnet as viewed from the viewing direction.

2. The disk drive of claim 1 wherein the first permanent magnet is at least 300 microns larger than the second permanent magnet, as measured in a measurement direction that is normal to the actuator pivot axis.

3. The disk drive of claim 1 wherein the biasing element is disposed closer to the protruding portion of the first permanent magnet than to the second permanent magnet.

4. The disk drive of claim 1 wherein the disk drive further comprises a disk drive cover, and wherein the first permanent magnet is disposed closer to the disk drive cover than is the second permanent magnet.

5. The disk drive of claim 1 wherein the disk drive further comprises a disk drive cover, and wherein the second permanent magnet is disposed closer to the disk drive cover than is the first permanent magnet.

6. The disk drive of claim 1 wherein each of the first and second permanent magnets is a rare earth magnet.

7. The disk drive of claim 6 wherein each of the first and second permanent magnets comprises an alloy that includes at least one metal selected from the group consisting of samarium, neodymium, dysprosium, praseodymium, terbium, gadolinium, and yttrium.

8. The disk drive of claim 1 wherein the biasing element of the actuator latch comprises a ferromagnetic metal ball.

9. The disk drive of claim 1 wherein the first and second permanent magnets are separated by a first separation distance, and wherein the biasing element of the actuator latch is separated from the first permanent magnet by a second separation distance that is less than the first separation distance.

10. The disk drive of claim 1 wherein the first permanent magnet is attached to the top magnet support plate of the ferromagnetic metal yoke structure.

11. The disk drive of claim 1 wherein the first permanent magnet is attached to the bottom magnet support plate of the ferromagnetic metal yoke structure.

* * * * *